United States Patent
Akkapeddi et al.

(10) Patent No.: US 9,447,321 B2
(45) Date of Patent: *Sep. 20, 2016

(54) OXYGEN SCAVENGING COMPOSITIONS FOR PLASTIC CONTAINERS

(71) Applicant: Graham Packaging Company, L.P., York, PA (US)

(72) Inventors: Murali K. Akkapeddi, York, PA (US); Brian A. Lynch, Merrimack, NH (US)

(73) Assignee: GRAHAM PACKAGING COMPANY, L.P., Lancaster, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/157,050

(22) Filed: Jan. 16, 2014

(65) Prior Publication Data

US 2015/0197623 A1    Jul. 16, 2015

(51) Int. Cl.
| | |
|---|---|
| C09K 15/12 | (2006.01) |
| C09K 15/10 | (2006.01) |
| C09K 15/06 | (2006.01) |
| C08L 71/02 | (2006.01) |

(Continued)

(52) U.S. Cl.
CPC ............ *C09K 15/12* (2013.01); *B65D 81/266* (2013.01); *B65D 81/267* (2013.01); *C08G 65/20* (2013.01); *C08G 65/3322* (2013.01);
(Continued)

(58) Field of Classification Search
CPC ...... C09K 15/06; C09K 15/10; C09K 15/12; C08K 2201/012; C08K 5/42; C08K 5/09; C08K 5/098; B65D 81/266; B65D 81/267; B65D 81/268; A23L 13/3436; A23L 3/3436; C07C 309/27; C07C 309/58; C65D 81/266; C65D 81/267; C65D 81/268

USPC .............. 252/188.1, 188.2, 188.28; 560/14
See application file for complete search history.

(56) References Cited

U.S. PATENT DOCUMENTS

| | | | |
|---|---|---|---|
| 3,864,287 A | | 2/1975 | Matsuda et al. |
| 3,947,273 A | * | 3/1976 | Pollet et al. ............... 430/266 |

(Continued)

FOREIGN PATENT DOCUMENTS

| | | |
|---|---|---|
| WO | WO 01/10947 A1 | 2/2001 |
| WO | WO 01/83318 A2 | 11/2001 |

(Continued)

OTHER PUBLICATIONS

International Search Report and Written Opinion mailed Mar. 25, 2015 by the European Patent Office as International Searching Authority for corresponding international patent application No. PCT/US2015/010832.

*Primary Examiner* — Mark Kopec
*Assistant Examiner* — Matthew R Diaz
(74) *Attorney, Agent, or Firm* — Stradley Ronon Stevens & Young, LLP

(57) ABSTRACT

The present invention provides an oxygen scavenging composition for incorporation into a wall of a package. The composition comprises a polyester base polymer, at least one oligomeric, oxidizable poly(alkylene ether) glycol-α,ω-diester having the formula

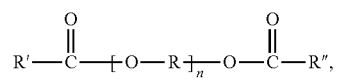

and at least one transition metal in a positive oxidation state. The compositions of the present invention do not exhibit an induction period prior to the onset of oxygen scavenging upon formation into a container.

33 Claims, 3 Drawing Sheets

(51) Int. Cl.
*B65D 81/26* (2006.01)
*C08G 65/332* (2006.01)
*C08G 65/334* (2006.01)
*C08K 5/42* (2006.01)
*C08K 5/098* (2006.01)
*C08G 65/20* (2006.01)

(52) U.S. Cl.
CPC ..... *C08G 65/3344* (2013.01); *C08G 65/3346* (2013.01); *C08K 5/098* (2013.01); *C08K 5/42* (2013.01); *C08L 71/02* (2013.01); *C09K 15/06* (2013.01); *C09K 15/10* (2013.01); *C08K 2201/012* (2013.01)

(56) References Cited

U.S. PATENT DOCUMENTS

| | | |
|---|---|---|
| 4,536,409 A | 8/1985 | Farrell et al. |
| 4,611,049 A * | 9/1986 | Kuratsuji et al. ............ 528/279 |
| 5,021,515 A | 6/1991 | Cochran et al. |
| 5,049,624 A | 9/1991 | Adams et al. |
| 5,075,362 A | 12/1991 | Hofeldt et al. |
| 5,211,875 A | 5/1993 | Speer et al. |
| 5,639,815 A | 6/1997 | Cochran et al. |
| 6,083,585 A | 7/2000 | Cahill et al. |
| 6,254,803 B1 | 7/2001 | Matthews et al. |
| 6,423,776 B1 | 7/2002 | Akkapeddi et al. |
| 6,455,620 B1 * | 9/2002 | Cyr et al. ...................... 524/376 |
| 6,558,762 B2 | 5/2003 | Cahill et al. |
| 8,450,398 B2 | 5/2013 | Deshpande |
| 2011/0275742 A1 | 11/2011 | Akkapeddi et al. |
| 2012/0283366 A1 | 11/2012 | Akkapeddi et al. |
| 2013/0306905 A1 | 11/2013 | Akkapeddi et al. |

FOREIGN PATENT DOCUMENTS

| | | |
|---|---|---|
| WO | 2009/032560 | 3/2009 |
| WO | WO 2010/128526 A2 | 11/2010 |
| WO | WO 2012/154379 A1 | 11/2012 |

* cited by examiner

OXYGEN SCAVENGING COMPOSITIONS FOR PLASTIC CONTAINERS

BACKGROUND OF THE INVENTION

The present invention relates to compositions useful for oxygen scavenging. The invention also relates to substantially transparent compositions that comprise a base polymer, an oxidizable organic component, and a transition metal in the positive oxidation state. The invention also is directed to uses of such compositions in the construction of packaging for oxygen sensitive materials.

All references, including publications, patent applications, and patents, cited herein are hereby incorporated by reference to the same extent as if each reference were individually and specifically indicated to be incorporated by reference and were set forth in its entirety herein.

It is known in the art to include an oxygen scavenger in the packaging structure for the protection of oxygen sensitive materials. Such scavengers are believed to react with oxygen that is trapped in the package or that permeates from outside of the package, thus extending to life of package contents. These packages include films, bottles, containers, and the like. Food, beverages (such as beer and fruit juices), cosmetics, medicines, and the like are particularly sensitive to oxygen exposure and require high barrier properties to oxygen to preserve the freshness of the package contents and avoid changes in flavor, texture and color.

Use of certain polyamides in combination with a transition metal is known to be useful as the oxygen scavenging material. One particularly useful polyamide is MXD6 which contains meta-xylene residues in the polymer chain. See, for example, U.S. Pat. Nos. 5,639,815; 5,049,624; and 5,021,515.

Other oxygen scavengers include potassium sulfite (U.S. Pat. No. 4,536,409), unsaturated hydrocarbons (U.S. Pat. No. 5,211,875), and ascorbic acid derivatives (U.S. Pat. No. 5,075,362).

U.S. Pat. Nos. 6,083,585 and 6,558,762 to Cahill disclose the oxygen scavenging polyester compositions wherein the oxygen scavenging component is polybutadiene and the catalyst for the oxygen scavenging material is transition metal salts.

U.S. Pat. No. 6,423,776 to Akkapeddi discloses the use of oxidizable polydienes or oxidizable polyethers as oxygen scavengers in blends with polyamides.

U.S. Pat. No. 6,254,803 to Ching discloses the use of polymers having at least one cyclohexenyl group or functionality as oxygen scavengers.

In barrier layers of packaging walls that are made from blends of a polymeric oxygen scavenging material such as that described in all of the above prior art, in a base polymer resin such as PET, an undesirable haze can result due to the immiscibility of the polymeric scavenging materials in PET. It is a well known fact that blends of polymers of dissimilar chemical structures invariably results in phase separation due their mutual segmental incompatibility. Phase separation is the root cause for the haze in such blends.

One approach to minimize the haze in polymer blends is the use of compatibilizers or interfacial agents which improve the dispersability of the polymeric scavenger in the base polymer. However this approach, while it may reduce somewhat, does not eliminate the haze and hence the desired high clarity is not achievable. Thus, there is a need in the art for improved materials such as lower molecular weight organic compounds or oligomers which provide high oxygen scavenging capability when blended into PET to form containers while maintaining substantial transparency. In principle, low molecular weight organic compounds of adequate polarity are capable of being miscible in base polymers such as PET due to their molecular size allowing them to penetrate into the free volume that exists between the base polymer chain segments and remain truly soluble due to favorable molecular interactions. Similarly polar organic oligomeric materials having a sufficiently high molecular weight (MW>400) for non-migratability from PET, yet having a sufficiently low molecular weight (i.e., MW of <4000) to prevent phase separation, are expected to be nearly miscible in PET.

Besides appearance, another problem experienced with prior art oxygen scavengers is that once they are incorporated into plastic containers, they require an induction period (i.e., time delay) before the onset of oxygen scavenging. For example, molded containers that employ diamides such as, for example, dibenzyl adipamide (DBA) as oxygen scavengers, the induction period can be at least three months at ambient temperature and humidity or at least four weeks at elevated temperature (38° C.) and humidity (85% RH) after the bottles are filled with deoxygenated water. This induction period is not acceptable in real commercial practice where plastic containers are made and filled immediately (or shortly thereafter) with an oxygen-sensitive food or beverage product. The oxygen scavenging must occur immediately after filling to protect the taste and nutrient qualities of the food and/or beverage products contained within.

Thus, there is a need in the art for effective oxygen scavenging compositions that satisfy container clarity requirements and eliminate any induction period for oxygen scavenging such that prolonged aging or conditioning of formed containers is not needed.

BRIEF SUMMARY OF THE INVENTION

In one aspect, the present invention provides an oligomeric, oxidizable poly(alkylene ether) glycol-α,ω-diester having the formula:

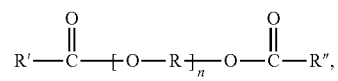

wherein, R is a substituted or unsubstituted alkylene chain having from 2 to 10 carbon atoms; R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and n is from 4 to 100, wherein at least one of R' and R" is (1) an alkyl sulfonic acid group or a metal salt thereof or (2) an aryl sulfonic acid group or a metal salt thereof.

In another aspect, the present invention provides a composition comprising: a) a polyester base polymer; b) at least one oligomeric, oxidizable poly(alkylene ether) glycol-α,ω-diester having the formula

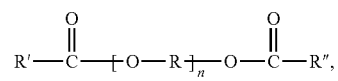

wherein, R is a substituted or unsubstituted alkylene chain having from 2 to 10 carbon atoms; R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and n is from 4 to 100; and c) at least one transition metal in a positive oxidation state, said metal being present in the composition in an amount of from about 10 to about 400 ppm, wherein the at least one oligomeric, oxidizable poly (alkylene ether) glycol-α,ω-diester is present in an amount of from about 0.10 to about 10 weight percent of the composition. In preferred embodiments, at least one of R' and R" is either (1) an alkyl sulfonic acid group or a metal salt thereof or (2) an aryl sulfonic acid group or a metal salt thereof.

In yet another aspect, the present invention provides a wall for a package comprising at least one layer, said layer comprising a composition, said composition comprising: a) a polyester base polymer; b) at least one oligomeric, oxidizable poly(alkylene ether) glycol-α,ω-diester having the formula

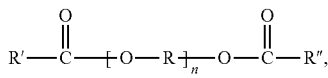

wherein, R is a substituted or unsubstituted alkylene chain having from 2 to 10 carbon atoms; R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and n is from 4 to 100; and c) at least one transition metal in a positive oxidation state, said metal being present in the composition in an amount of from about 10 to about 400 ppm. In preferred embodiments, at least one of R' and R" is either (1) an alkyl sulfonic acid group or a metal salt thereof or (2) an aryl sulfonic acid group or a metal salt thereof.

DETAILED DESCRIPTION OF THE INVENTION

Figure 1:
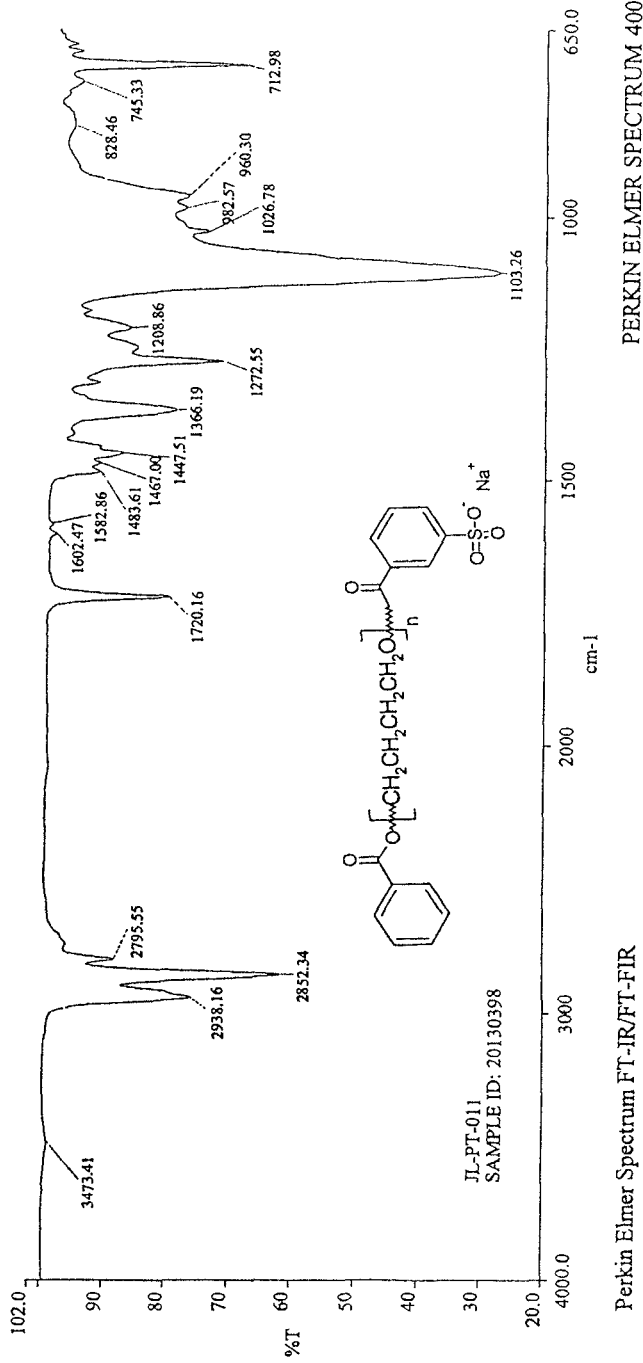
FIG. 1 is an FTIR spectrum of an oligomeric PTMEG diester functionalized according to the present invention as detailed in Example 1.

The present invention concerns compositions that are useful in the manufacture of packaging for oxygen sensitive materials. In some embodiments, the compositions of the present invention comprise an oligomeric, oxidizable poly (alkylene ether) glycol-α,ω-diester of Formula I:

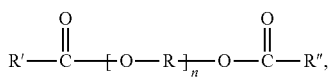
(I)

wherein, R is a substituted or unsubstituted alkylene chain having from 2 to 10 carbon atoms; R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and n is from 4 to 100. The molecular weights of these oxidizable poly(alkylene ether) glycol-α,ω-diester oligomers typically range from about ≥400 to about ≤4000. In preferred embodiments, at least one of R' and R" is either (1) an alkyl sulfonic acid group or a metal salt thereof or (2) an aryl sulfonic acid group or a metal salt thereof.

In other embodiments, the compositions of the present invention comprise a polyester base polymer, the oligomeric, oxidizable poly(alkylene ether) glycol-α,ω-diester of Formula I, and a transition metal in a positive oxidation state, wherein the composition exhibits excellent oxygen scavenging properties as well as excellent clarity (i.e., lack of haze) when blow molded, for example, from a preform into a monolayer container via an injection stretch blow molding process. The composition of the present invention preferably does not require an induction period prior to any significant oxygen scavenging.

Base Polymer

Compositions of the instant invention comprise at least one base polymer. As used herein, the term "base polymer" refers to a polymer component of a container of the present invention that provides the structure and mechanical properties of the container. The term "base polymer" is synonymous with the term "structural polymer," which is commonly used in the art.

In preferred embodiments, the base polymer is a polyester. In certain embodiments, the polyester polymers of the invention are thermoplastic and, thus, the form of the compositions are not limited and can include a composition in the melt phase polymerization, as an amorphous pellet, as a solid stated polymer, as a semi-crystalline particle, as a composition of matter in a melt processing zone, as a bottle preform, or in the form of a stretch blow molded bottle or other articles. In certain preferred embodiments, the polyester is polyethylene terephthalate (PET).

Examples of suitable polyester polymers include polyethylene terephthalate homopolymers and copolymers modified with one or more polycarboxylic acid modifiers in a cumulative amount of less than about 15 mole %, or about 10 mole % or less, or about 8 mole % or less, or one or more hydroxyl compound modifiers in an amount of less than about 60 mol %, or less than about 50 mole %, or less than about 40 mole %, or less than about 15 mole %, or about 10 mole % or less, or about 8 mole % or less (collectively referred to for brevity as "PET") and polyethylene naphthalate homopolymers and copolymers modified with a cumulative amount of with less than about 15 mole %, or about 10 mole % or less, or about 8 mole % or less, of one or more polycarboxylic acid modifiers or modified less than about 60 mol %, or less than about 50 mole %, or less than about 40 mole %, or less than about 15 mole %, or about 10 mole % or less, or about 8 mole % or less of one or more hydroxyl compound modifiers (collectively referred to herein as "PEN"), and blends of PET and PEN. A modifier polycarboxylic acid compound or hydroxyl compound is a compound other than the compound contained in an amount of at least about 85 mole %. The preferred polyester polymer is polyalkylene terephthalate, and most preferred is PET.

In some embodiments, the polyester polymer contains at least about 90 mole % ethylene terephthalate repeat units, and in other embodiments, at least about 92 mole %, and in yet other embodiments, or at least about 94 mole %, based on the moles of all repeat units in the polyester polymers.

In addition to a diacid component of terephthalic acid, derivates of terephthalic acid, naphthalene-2,6-dicarboxylic acid, derivatives of naphthalene-2,6-dicarboxylic acid, or mixtures thereof, the polycarboxylic acid component(s) of the present polyester may include one or more additional modifier polycarboxylic acids. Such additional modifier polycarboxylic acids include aromatic dicarboxylic acids preferably having about 8 to about 14 carbon atoms, aliphatic dicarboxylic acids preferably having about 4 to about 12 carbon atoms, or cycloaliphatic dicarboxylic acids preferably having about 8 to about 12 carbon atoms.

Examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "polycarboxylic acid." It is also possible for trifunctional and higher order polycarboxylic acids to modify the polyester.

The hydroxyl component is made from compounds containing 2 or more hydroxyl groups capable of reacting with a carboxylic acid group. In some preferred embodiments, preferred hydroxyl compounds contain 2 or 3 hydroxyl groups. Certain preferred embodiments, have 2 hydroxyl groups. These hydroxyl compounds include $C_2$-$C_4$ alkane diols, such as ethylene glycol, propane diol, and butane diol, among which ethylene glycol is most preferred for container applications. In addition to these diols, other modifier hydroxyl compound component(s) may include diols such as cycloaliphatic diols preferably having 6 to 20 carbon atoms and/or aliphatic diols preferably having about 3 to about 20 carbon atoms. Examples of such diols include diethylene glycol; triethylene glycol; 1,4-cyclohexanedimethanol; propane-1,3-diol and butane-1,4-diol (which are considered modifier diols if ethylene glycol residues are present in the polymer in an amount of at least 85 mole % based on the moles of all hydroxyl compound residues); pentane-1,5-diol; hexane-1,6-diol; 3-methylpentanediol-(2,4); neopentyl glycol; 2-methylpentanediol-(1,4); 2,2,4-trimethylpentane-diol-(1,3); 2,5-ethylhexanediol-(1,3); 2,2-diethyl propane-diol-(1,3); hexanediol-(1,3); 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane. Typically, polyesters such as polyethylene terephthalate are made by reacting a glycol with a dicarboxylic acid as the free acid or its dimethyl ester to produce an ester monomer and/or oligomers, which are then polycondensed to produce the polyester.

In some preferred embodiments, modifiers include isophthalic acid, naphthalenic dicarboxylic acid, trimellitic anhydride, pyromellitic dianhydride, 1,4-cyclohexane dimethanol, and diethylene glycol. The amount of the polyester polymer in the formulated polyester polymer composition ranges from greater than about 50.0 wt. %, or from about 80.0 wt. %, or from about 90.0 wt. %, or from about 95.0 wt. %, or from about 96.0 wt. %, or from about 97 wt. %, and up to about 99.90 wt. %, based on the combined weight of all polyester polymers and all polyamide polymers. The formulated polyester polymer compositions may also include blends of formulated polyester polymer compositions with other thermoplastic polymers such as polycarbonate. In some preferred compositions, the polyester comprises a majority of the composition of the inventions, and in some embodiments the polyester is present in an amount of at least about 80 wt. %, or at least about 90 wt. %, based on the weight of the composition (excluding fillers, inorganic compounds or particles, fibers, impact modifiers, or other polymers serve as impact modifiers or which form a discontinuous phase such as may be found in cold storage food trays).

The polyester compositions can be prepared by polymerization procedures known in the art sufficient to effect esterification and polycondensation. Polyester melt phase manufacturing processes include direct condensation of a dicarboxylic acid with the diol, optionally in the presence of esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and finishing in the presence of a polycondensation catalyst, and each may optionally be solid stated according to known methods.

Other base polymers may be used with the instant invention. One example is polypropylene.

In some embodiments of the present invention, the polyester compositions of the base polymer comprises less than about 40 ppm of phosphorous, preferably less than about 30 ppm of phosphorous, more preferably less than about 20 ppm of phosphorous, still more preferably less than about 10 ppm of phosphorous, and most preferably the polyester base polymer is substantially free of phosphorous. A used herein, the term "substantially free of phosphorous" means from 0 to about 1 ppm of total phosphorous. Typical bottle grade PET resins comprise greater than about 40 ppm of phosphorous in the form of phosphoric or phosphonic acid, which are typically used as a stabilizer additive during the resin-forming process. Without intending to be bound any particular theory, it is believed that the phosphorous interferes with the cobalt (or other transition metal) and significantly hinders the efficiency of the cobalt (or other transition metal) to act as an oxidation catalyst and the result is an induction period of from one to three months before oxygen scavenging can be detected in a blow molded bottle. Polyester containers comprising a polyester base polymer of less than about 40 ppm of phosphorous blended with an oxidizable organic component such as, for example, those described below, surprisingly exhibit excellent oxygen scavenging properties without an induction period as was expected in the art. Suitable "low phosphorous" PET resins are commercially available and include, for example, DAK Laser+ L44A and L44B, which are available from DAK Americas LLC, Chadds Ford, Pa. 19317, USA. One of ordinary skill in the art would indeed know how to manufacture polyester resins that are substantially free of phosphorous.

In preferred embodiments, the polyester base resin is also substantially free of titanium. It has also been discovered that titanium may also interfere with the oxidation catalyst.

Oligomeric Oxidizable Organic Component

Compositions of the present invention also comprise an oligomeric oxidizable organic component. It is preferred that the oligomeric oxidizable organic component of the present invention has a high degree of affinity for polyesters, the preferred base polymer. Preferably, the oligomeric oxidizable organic compound is an oligomeric poly(alkylene ether) glycol-α,ω-diester of Formula I:

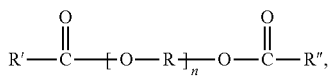

(I)

wherein, R is a substituted or unsubstituted alkylene chain having from 2 to 10 carbon atoms; R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and n is from 4 to 100. The molecular weights of these oligomers preferably range from about ≥400 to about ≤4000. In preferred embodiments, at least one of R' and R" is either (1) an alkyl sulfonic acid group or a metal salt thereof or (2) an aryl sulfonic acid group or a metal salt thereof.

As used herein, the term "alkylene" refers to an alkyl group linking at least two other groups, i.e., a divalent hydrocarbon radical of 1 to 6 carbon atoms. As for alkyl, the alkylene group can be straight or branched. For instance, a straight chain alkylene can be the bivalent radical of —(CH$_2$)$_m$—, where m is 1, 2, 3, 4, 5, 6, 7, 8, 9, or 10. Alkylene groups include, but are not limited to, methylene, ethylene, propylene, butylene, pentylene and hexylene.

As used herein, the term "aliphatic" refers to a substituted or unsubstituted alkyl group. Alkyl groups have straight and branched chains. In some embodiments, alkyls have from 1 to 18 carbon atoms, 1 to 13 carbon atoms, or 1 to 6 carbon atoms, unless explicitly specified otherwise. Alkyl groups include, bur are not limited to methyl, ethyl, propyl, isopropyl, butyl, 1-butyl and t-butyl. Specifically included within the definition of "aliphatic" are those aliphatic hydrocarbon chains that are optionally substituted.

As used herein, the term "aromatic" or "aryl" is defined herein as a carbocyclic moiety of up to 20 carbon atoms. In some embodiments, aromatic groups have 6-20 carbon atoms or 6-14 carbon atoms. Aromatic groups may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, and acenaphthylenyl. In some embodiments, phenyl is a preferred aryl. Aryl groups may also be optionally substituted with one or more substituents.

Optional substituents for alkyl, alkenyl, or aryl groups are well known to those skilled in the art. These substituents include alkyl, alkoxy, aryloxy, hydroxy, acetyl, cyano, nitro, glyceryl, and carbohydrate, or two substituents taken together may be linked as an -alkylene-group to form a ring.

As used herein, the term "oligomer" or "oligomeric" refers to a relatively low molecular weight polymer in which the number of repeating units is between two and ten, for example, from two to eight, from two to six, or from two to four. In one aspect, a collection of oligomers can have an average number of repeating units of from about two to about ten, for example, from about two to about eight, from about two to about six, or from about two to about four.

In the compound of Formula I, R is a substituted or unsubstituted alkylene chain having, preferably, from 2 to 10 carbon atoms. In Formula I, R symbolizes the carbon portion of an oligomeric polyether component of the oxidizable organic compound. Suitable polyethers include unsubstituted poly(alkylene glycol)s having alkylene chains of 1 to 3 carbon atoms, substituted or unsubstituted poly(alkylene glycol)s having alkylene chains of at least 4 carbon atoms and preferably less than 10 carbon atoms. The poly(alkylene glycol)s can be obtained by methods well known in the art. Examples of poly(alkylene glycol)s include poly(ethylene glycol), poly(trimethylene glycol), poly(tetramethylene glycol), poly(pentamethylene glycol), poly(hexamethylene glycol), poly(heptamethylene glycol), and poly(octamethylene glycol). Preferred poly(alkylene glycols) include poly(ethylene glycol) and poly(tetramethylene glycol).

It is preferred that the oxidizable poly(alkylene ether) glycol-α,ω-diester of Formula I is an oligomer because higher molecular weights tend to be not as miscible with PET when blended which can lead to loss of clarity and also delamination problems when employed in a multilayer container. Almost any number of repeating units may be used as long as the compound is not polymeric. For example, the target number average molecular weights are preferably in the range of from about 500 to about 5,000, more preferably from about 1000 to about 4000, and even more preferably from about 1500 to about 2500. A number average molecular weight of about 2000 is highly preferred. In the compound of Formula I, n is preferably from 4 to 100, more preferably from about 10 to 40, and most preferably about 20 to 30.

The number average molecular weight (Mn) can be determined by methods known to those skilled in the art. In one method, the equivalent weight is obtained first by end group measurement such as by an IR method. Mn=Eq. wt×functionality (e.g., 2×eq. wt. for a difunctional oligomer or polymer). In another example, as for the case of polyether polyols, the hydroxyl end group content, which is commonly referred to as 'hydoxyl number (OH)', is measured by titrating a known mass of the polyol against potassium hydroxide (KOH) and is expressed as mg KOH/g. From this the equivalent weight of polyether polyol is calculated as follows: Equivalent weight of polyether polyol=56,100/OH number; Molecular Weight=Eq. wt×polyol functionality; For a diol, MW (Mn)=Eq. wt×2 or 112,200/Hydroxyl no.

Without intending to be bound by a particular theory, it is believed that the polyether component provides an oxidizable organic moiety that reacts with oxygen when in the presence of a transition metal in the positive oxidation state.

In the compound of Formula I, R' and R" are each independently an alkyl sulfonic acid group or a metal salt thereof, an aryl sulfonic acid group or a metal salt thereof, an alkyl (or aliphatic) group having from 1 to 18 carbon atoms, or an aromatic group having from 6 to 18 carbon atoms. In some embodiments, the oligomeric polyether component is endcapped at each end with a carboxylic acid.

In a preferred embodiment, In preferred embodiments, at least one of R' and R" is either (1) an alkyl sulfonic acid group or a metal salt thereof or (2) an aryl sulfonic acid group or a metal salt thereof. In such embodiments, the other of R' and R" may be an organic carboxylic acid.

The alkyl and aryl sulfonic acid components may include, for example, mono- or poly-sulfonic acids or their metal salts such as alkali or alkaline earth metal salts, their esters and their halides.

Preferred aryl (or aromatic) sulfonic acids are, for example, compounds represented by the following formula

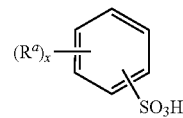

wherein $R^a$ represents a hydrogen atom, an alkyl group having 1 to 4 carbon atoms, a hydroxyl group, a carboxyl group, a ($C_1$-$C_4$ alkyl)oxycarbonyl group, a nitro group, an amino group, a hydroxyamino group, a hydrazino group or a sulfonic acid group, x is an integer of 1 or 2, provided that when x is 2, the two $R^a$'s may be identical or different, and compounds capable of producing aromatic sulfonic acids in the reaction system, such as their metal salts, esters or acid halides.

The $C_1$-$C_4$ alkyl group represented by R may be linear or branched, and represents methyl, ethyl, propyl or butyl.

Examples of the aryl sulfonic acid compounds include aromatic sulfonic acids such as benzenesulfonic acid, toluenesulfonic acid, naphthalene sulfonic acid, phenolsulfonic acid, sulfobenzoic acid, nitrobenzenesulfonic acid, anilinesulfonic acids (orthanilic acid, metanilic acid, and sulfanilic acid), phenylhydroxylaminesulfonic acid, hydrazinobenzenesulfonic acid and benzenedisulfonic acid; metal salts thereof such as sodium benzenesulfonate and sodium toluenesulfonate; esters thereof such as dimethyl sulfonbenzoate; and acid halides thereof such as benzenesulfonyl chloride.

The alkyl (i.e., aliphatic) sulfonic acids are preferably alkylsulfonic acids having 1 to 18 carbon atoms, alkenylsulfonic acids having 3 to 18 carbon atoms, and compounds capable of producing aliphatic sulfonic acids in the reaction system, such as their metal salts, esters or acid halides. The alkyl group having 1 to 18 carbon atoms and the alkenyl group having 3 to 18 carbon atoms may be linear or branched. Examples of the alkyl group having 1 to 18 carbon atoms are methyl, ethyl, propyl, butyl, pentyl, hexyl, heptyl, octyl, nonyl, decyl, undecyl, dodecyl, tridecyl, tetradecyl, heptadecyl and octadecyl.

The alkenyl group having 3 to 18 carbon atoms are allyl (2-propenyl), 3-butenyl, 4-pentenyl and 10-undecenyl.

Thus preferred examples of the alkylsulfonic acids include alkylsulfonic acids such as methanesulfonic acids, ethanesulfonic acids, propanesulfonic acids, butanesulfonic acid, pentanesulfonic acid, hexanesulfonic acid, tetradecanesulfonic acid; metal salts thereof such as sodium and potassium salts; esters thereof such as methyl or ethyl esters thereof; and acid halides thereof such as their acid chlorides.

Examples of preferred alkenylsulfonic acids are allylsulfonic acid, 3-butenylsulfonic acid and 4-pentenylsulfonic acid; and metal salts, esters and acid halides thereof similar to the above.

Examples of a non-sulfonic acid-containing aromatic group for either R' or R" include those defined above. Aromatic groups may be a single ring (monocyclic) or multiple rings (bicyclic, up to three rings) fused together or linked covalently. Any suitable ring position of the aryl moiety may be covalently linked to the defined chemical structure. Aryl groups include, but are not limited to, phenyl, 1-naphthyl, 2-naphthyl, dihydronaphthyl, tetrahydronaphthyl, biphenyl, anthryl, phenanthryl, fluorenyl, indanyl, biphenylenyl, acenaphthenyl, and acenaphthylenyl.

In the oligomeric, oxidizable poly(alkylene ether) glycol-$\alpha,\omega$-diester defined by Formula I, at least one of R' and R" is an organic sulfonic acid group or a metal salt thereof. Without intending to be bound by a particular theory, the organic sulfonic acid group functions to bind the transition metal catalyst directly to the molecule such that the catalyst is closer to the oxidizable portion (i.e., the poly ether component). As a result, the composition is able to scavenge oxygen immediately after being formed into a container, thereby eliminating an induction period that otherwise would be required to initiate oxygen scavenging for such compositions. In other words, the oligomer of Formula I is self-activated.

At least one of the oligomeric, oxidizable poly(alkylene ether) glycol-$\alpha,\omega$-diester compounds described herein normally will be used in an amount of about 0.1 to about 10 weight percent in an article based on the weight of the composition. In some preferred embodiments, the oligomeric, oxidizable poly(alkylene ether) glycol-$\alpha,\omega$-diester(s) will be present in an amount of about 1 to about 5 weight percent based on the weight of the composition. In other embodiments, the oligomeric, oxidizable poly(alkylene ether) glycol-$\alpha,\omega$-diester(s) will be present in an amount of about 1 to about 3 weight percent based on the weight of the composition. In yet other embodiments, the oligomeric, oxidizable poly(alkylene ether) glycol-$\alpha,\omega$-diester (s) will be present in an amount of about 0.5 to about 1 weight percent based on the weight of the composition.

In master batch solutions the amount of oligomeric, oxidizable poly(alkylene ether) glycol-$\alpha,\omega$-diester will typically be from about 10 to about 90 weight percent based on the weight of the composition. In some preferred embodiments, the amount of oligomeric, oxidizable poly(alkylene ether) glycol-$\alpha,\omega$-diester will be from about 20 to about 80 weight percent based on the weight of the composition.

An example of an oligomeric, oxidizable poly(alkylene ether) glycol-$\alpha,\omega$-diester of the present invention is PTMG-di-sodiumsulfobenzoate:

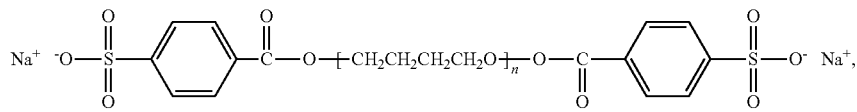

A non-sulfonic acid-containing aliphatic group for either R' or R" is preferably an alkyl group having 1 to 18 carbon atoms. The alkyl group having 1 to 18 carbon atoms may be linear or branched. Examples of the alkyl group having 1 to 18 carbon atoms include methyl, ethyl, propyl, butyl, pentyl, hexyl, heptyl, octyl, nonyl, decyl, undecyl, dodecyl, tridecyl, tetradecyl, heptadecyl and octadecyl.

which is the product of an esterification reaction between poly(tetramethylene ether) glycol and 3-sodiosulfo benzoic acid, which forms benzosulfonic acid ester end caps.

Another example is the product of an oligomeric, oxidizable poly(alkylene ether) glycol-$\alpha,\omega$-diester of the present invention is PTMG-di-benzoate/sulfobenzoate:

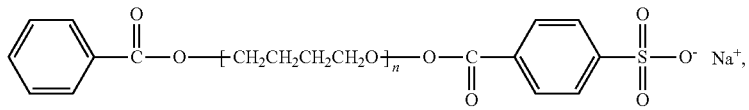

which is the product of an esterfication reaction between poly(tetramethylene ether) glycol and 3-sodiosulfo benzoic acid and benzoic acid, which forms mixed benzo and benzosulfonic acid ester end caps.

Each of these compounds when in the presence of a transition metal in the positive oxidation state will scavenge oxygen when incorporated into a PET package wall.

In some embodiments, the oxidizable composition of the present invention comprises a mixture of oligomeric, oxidizable poly(alkylene ether) glycol-α,ω-diesters. In one exemplary embodiment, the oxidzable composition comprises a) an oligomeric, oxidizable poly(alkylene ether) glycol-α,ω-diester according to Formula I; and b) at least one oligomeric, oxidizable poly(alkylene ether) glycol-α,ω-diester having the formula

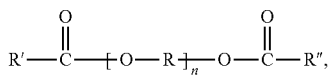

wherein, R is a substituted or unsubstituted alkylene chain having from 2 to 10 carbon atoms; R' and R" are each independently an alkyl group having from 1 to 18 carbon atoms, or an aromatic group having from 6 to 18 carbon atoms; and n is from 4 to 100.

In another exemplary embodiment, the oxidzable composition comprises a) an oligomeric, oxidizable poly(alkylene ether) glycol-α,ω-diester according to Formula I; and b) at least one oligomeric, oxidizable poly(alkylene ether) glycol-α,ω-diester having the formula HO—[R—O]$_n$—H, wherein, R is a substituted or unsubstituted alkylene chain having from 2 to 10 carbon atoms; and n is from 4 to 100. glycol ether component preferably employed in the present ink vehicle includes any of the glycol ethers and thioglycol ethers commonly employed in the inks used in ink-jet printing, or a mixture thereof. Examples of oxidizable poly(alkylene ether) glycol-α,ω-diester having the formula HO—[R—O]$_n$—H, wherein, R is a substituted or unsubstituted alkylene chain having from 2 to 10 carbon atoms, include polyalkylene glycols such as polyethylene glycols (e.g., diethylene glycol, triethylene glycol, tetraethylene glycol, etc.); polypropylene glycols (e.g., dipropylene glycol, tripropylene glycol, tetrapropylene glycol, etc.); and oligomeric glycols (e.g., PEG 200, PEG 300, PEG 400, PPG 400, etc.).

Transition Metal

The transition metal used in the instant compositions is a metal in the positive oxidation state. It should be noted that it is contemplated that one or more such metals may be used. The transition metal functions to catalyze or promote the oxidation of the organic oxidizable component(s) (i.e., the reaction of the organic oxidizable component with molecular oxygen).

The transition metal can be selected from the first, second, or third transition series of the Periodic Table. The metal can be Rh, Ru, or one of the elements in the series of Sc to Zn (i.e., Sc, Ti, V, Cr, Mn, Fe, Co, Ni, Cu, and Zn). In some embodiments, cobalt is added in +2 or +3 oxidation state. In some embodiments, it is preferred to use cobalt in the +2 oxidation state. In certain embodiments, copper in the +2 oxidation state is utilized. In some embodiments, rhodium in the +2 oxidation state is used. In certain embodiments, zinc may also be added to the composition. Preferred zinc compounds include those in a positive oxidation state.

Suitable counter-ions to the transition metal cations include carboxylates, such as neodecanoates, octanoates, acetates, lactates, naphthalates, malates, stearates, acetylacetonates, linoleates, oleates, palmitates, 2-ethylhexanoates, or ethylene glycolates; or as their oxides, borates, carbonates, chlorides, dioxides, hydroxides, nitrates, phosphates, sulfates, or silicates among others.

In some embodiments, levels of at least about 10 ppm, or at least about 50 ppm, or at least about 100 ppm of metal can achieve suitable oxygen scavenging levels. The exact amount of transition metal used in an application can be determined by trials that are well within the skill level of one skilled in the art. In some embodiments involving wall applications (as opposed to master batch applications where more catalyst is used), it is preferred to keep the level of metal below about 300 ppm and, in other embodiments, preferably below about 250 ppm. In master batch compositions, the level of transition metal may range from about 1000 to about 10,000 ppm. In some preferred embodiments, the range is from about 2000 to about 5000 ppm.

The transition metal or metals may be added neat or in a carrier (such as a liquid or wax) to an extruder or other device for making the article, or the metal may be present in a concentrate or carrier with the oligomeric oxidizable organic component, in a concentrate or carrier with a base polymer, or in a concentrate or carrier with a base polymer/oxidizable organic component blend. Alternatively, at least a portion of the transition metal may be added as a polymerization catalyst to the melt phase reaction for making the base polymer (a polyester polymer in some embodiments) and be present as residual metals when the polymer is fed to the melting zone (e.g. the extrusion or injection molding zone) for making the article such as a preform or sheet. It is desirable that the addition of the transition metal does not substantially increase the intrinsic viscosity (IV) of the melt in the melt processing zone. Thus, transition metal or metals may be added in two or more stages, such as once during the melt phase for the production of the polyester polymer and again once more to the melting zone for making the article.

The amounts of the components used in the oxygen scavenging formulations of the present invention can affect the use and effectiveness of this composition. Thus, the amounts of base polymer, transition metal catalyst, and oligomeric oxidizable component can vary depending on the desired article and its end use. For example, the primary function of the oligomeric organic oxidizable component detailed above is to react irreversibly with oxygen during the scavenging process, while a primary function of the transition metal catalyst is to facilitate this process. Thus, to a large extent, the amount of the oligomeric organic oxidizable component present affects the oxygen scavenging capacity of the composition, i.e., the amount of oxygen that the composition can consume, while the amount of transition metal catalyst affects the rate at which oxygen is consumed as well as the induction period.

The oxygen scavenger composition of the present invention can be incorporated in packaging articles having various forms. Suitable articles include, but are not limited to, flexible sheet films, flexible bags, pouches, semi-rigid and rigid containers such as bottles (e.g., PET bottles) or metal cans, or combinations thereof.

Typical flexible films and bags include those used to package various food items and may be made up of one or a multiplicity of layers to form the overall film or bag-like packaging material. The oxygen scavenger composition of the present invention can be used in one, some or all of the layers of such packaging material.

Typical rigid or semi-rigid articles include plastic, paper or cardboard containers, such as those utilized for juices, soft drinks, as well as thermoformed trays or cup normally having thickness in the range of from 100 to 1000 micrometers. The walls of such articles can comprise single or multiple layers of materials. The articles can also take the form of a bottle or metal can, or a crown, cap, crown or cap liner, plastisol or gasket. The oxygen scavenger composition of the present invention can be used as an integral layer or portion of, or as an external or internal coating or liner of, the formed semi-rigid or rigid packaging article. As a liner, the oxygen scavenger composition can be extruded as a film along with the rigid article itself, in, e.g., a coextrusion, extrusion coating, or extrusion lamination process, so as to form the liner in situ during article production; or alternatively can be adhered by heat and/or pressure, by adhesive, or by any other suitable method to an outer surface of the article after the article has been produced.

In one preferred embodiment of the present invention, the composition of the present invention, i.e., a base polymer, a transition metal in a positive oxygen state, at least one oligomeric oxidizable organic component as described above, and at least one activator compound as described above can be employed to form a monolayer bottle. In another preferred embodiment of the present invention, the composition of the present invention can form one layer of a multilayer bottle wherein the layer comprising the composition of the present invention comprises from at least 1% and typically 2 to 6% of a compound or Formula I.

Besides articles applicable for packaging food and beverage, articles for packaging other oxygen-sensitive products can also benefit from the present invention. Such products would include pharmaceuticals, oxygen sensitive medical products, corrodible metals or products, electronic devices and the like.

The composition may also include other components such as pigments, fillers, crystallization aids, impact modifiers, surface lubricants, denesting agents, stabilizers, ultraviolet light absorbing agents, metal deactivators, nucleating agents such as polyethylene and polypropylene, phosphite stabilizers and dyestuffs. Other additional components are well known to those skilled in the art and can be added to the existing composition so long as they do not negatively impact the performance of the compositions. Typically, the total quantity of such components will be less than about 10% by weight relative to the whole composition. In some embodiments, the amount of these optional components is less than about 5%, by weight relative to the total composition.

A common additive used in the manufacture of polyester polymer compositions used to make stretch blow molded bottles is a reheat additive because the preforms made from the composition must be reheated prior to entering the mold for stretch blowing into a bottle. Any of the conventional reheat additives can be used, such additives include various forms of black particles, e.g. carbon black, activated carbon, black iron oxide, glassy carbon, and silicon carbide; the gray particles such as antimony, and other reheat additives such as silicas, red iron oxide, and so forth.

In many applications, not only are the packaging contents sensitive to the ingress of oxygen, but the contents may also be affected by UV light. Fruit juices and pharmaceuticals are two examples of such contents. Accordingly, in some embodiments, it is desirable to incorporate into the polyester composition any one of the known UV absorbing compounds in amounts effective to protect the packaged contents.

The instant compositions can be made by mixing a base polymer (PET, for example) with the oligomeric oxidizable organic component and the transition metal composition. Such compositions can be made by any method known to those skilled in the art. In certain embodiments, some or part of the transition metal may exist in the base polymer prior to mixing. This residual metal, for example, can exist from the manufacturing process of the base polymer. In some embodiments, the base polymer, the oligomeric oxidizable organic component and the transition metal are mixed by tumbling in a hopper. Other optional ingredients can be added during this mixing process or added to the mixture after the aforementioned mixing or to an individual component prior to the aforementioned mixing step.

The instant composition can also be made by adding each ingredient separately and mixing the ingredients prior melt processing the composition to form an article. In some embodiments, the mixing can be just prior to the melt process zone. In other embodiments, one or more ingredients can be premixed in a separate step prior to bringing all of the ingredients together.

In some embodiments, the invention concerns use of the compositions described herein as a component of a wall that is used in a package for oxygen sensitive materials. The necessary scavenging capacity of a package will generally have to be greater for walls that have a greater permeance in the absence of scavenging additives. Accordingly, a good effect is harder to achieve with inherently higher permeance materials are used.

The wall may be a rigid one, a flexible sheet, or a clinging film. It may be homogenous or a laminate or coated with other polymers. If it is laminated or coated, then the scavenging property may reside in a layer of the wall the permeance of which is relatively high in the absence of scavenging and which alone would not perform very satisfactorily but which performs satisfactorily in combination with one or more other layers which have a relatively low permeance but negligible or insufficient oxygen-scavenging properties. A single such layer could be used on the outside of the package since this is the side from which oxygen primarily comes when the package is filled and sealed. However, such a layer to either side of the scavenging layer would reduce consumption of scavenging capacity prior to filling and sealing.

When the instant compositions are used in a wall or as a layer of a wall, the permeability of the composition for oxygen is advantageously not more than about 3.0, or about 1.7, or about 0.7, or about 0.2, or about 0.03 $cm^3$ mm/($m^2$ atm day). The permeability of the composition provided by the present invention is advantageously not more than about three-quarters of that in the absence of oxygen-scavenging properties. In some embodiments, the permeability is not more than about one half, one-tenth in certain embodiments, one twenty-fifth in other embodiments, and not more than one-hundredth in yet other embodiments of that in the absence of oxygen-scavenging properties. The permeability in the absence of oxygen-scavenging properties is advantageously not more than about 17 $cm^3$ mm/($m^2$ atm day), or about 10, and or about 6. A particularly good effect can be achieved for such permeabilities in the range from about 0.5, or about 1.0, to 10, or about 6.0, $cm^3$ mm/($m^2$ atm day). Measuring oxygen permeation can be performed by one of ordinary skilled in the art employing oxygen permeation (OTR) instrumentation such as, for example, OX-TRAN® instruments available from MOCON, Inc. (Minneapolis, Minn.).

In another aspect, the instant composition can be used as a master batch for blending with a polymer or a polymer containing component. In such compositions, the concentration of the oxidizable organic component and the transition metal will be higher to allow for the final blended product to have suitable amounts of these components. The master batch may also contain an amount of the polymer to which the master batch is to be blended with. In other embodiments, the master batch may contain a polymer that is compatible with the polymer to which the master batch is to be blended.

In yet another aspect, the compositions of the instant invention can be used for forming a layer of a wall which primarily provides oxygen-scavenging (another layer including polymer providing gas barrier without significant scavenging), or as a head-space scavenger (completely enclosed, together with the package contents, by a package wall). Such techniques are well know to those skilled in the art.

The time period for which the permeability is maintained can be extended by storing the articles in sealed containers or under an inert atmosphere such as nitrogen prior to use with oxygen sensitive materials.

In another aspect, the invention provides a package, whether rigid, semi-rigid, collapsible, lidded, or flexible or a combination of these, comprising a wall as formed from the compositions described herein. Such packages can be formed by methods well known to those skilled in the art.

Among the techniques that may be used to make articles are moulding generally, injection moulding, stretch blow moulding, extrusion, thermoforming, extrusion blow moulding, and (specifically for multilayer structures) co-extrusion and lamination using adhesive tie layers. Orientation, e.g., by stretch blow moulding, of the polymer is especially attractive with phthalate polyesters because of the known mechanical advantages that result.

The melt processing zone for making the article can be operated under customary conditions effective for making the intended articles, such as preforms, bottles, trays, and other articles mentioned below. In one embodiment, such conditions are effective to process the melt without substantially increasing the IV of the melt and which are ineffective to promote transesterification reactions. In some preferred embodiments, suitable operating conditions effective to establish a physical blend of the polyester polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig to about 900 psig. In some embodiments, the residence time of the melt on the screw can range from about 1 to about 4 minutes.

Specific articles include preforms, containers and films for packaging of food, beverages, cosmetics, pharmaceuticals, and personal care products where a high oxygen barrier is needed. Examples of beverage containers are bottles for holding water and carbonated soft drinks, and the invention is particularly useful in bottle applications containing juices, sport drinks, beer or any other beverage where oxygen detrimentally affects the flavor, fragrance, performance (prevent vitamin degradation), or color of the drink. The compositions of the instant invention are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of oxygen. The compositions of the instant invention also find use in the manufacture of cosmetic containers and containers for pharmaceuticals or medical devices.

The package walls of the instant invention can be a single layer or a multilayer constructions. In some embodiments using multilayer walls, the outer and inner layers may be structural layers with one or more protective layers containing the oxygen scavenging material positioned there between. In some embodiments, the outer and inner layers comprise and polyolefin or a polyester. In certain embodiments, a single layer design is preferred. Such a layer may have advantages in simplicity of manufacture and cost.

In this specification and in the claims that follow, reference will be made to a number of terms, which shall be defined to have the following meanings:

As used herein, the phrase "having the formula" or "having the structure" is not intended to be limiting and is used in the same way that the term "comprising" is commonly used. The term "independently selected from" is used herein to indicate that the recited elements, e.g., R groups or the like, can be identical or different.

As used herein, the terms "a", "an", the and the like refer to both the singular and plural unless the context clearly indicates otherwise. "A bottle", for example, refers to a single bottle or more than one bottle.

Also as used herein, the description of one or more method steps does not preclude the presence of additional method steps before or after the combined recited steps. Additional steps may also be intervening steps to those described. In addition, it is understood that the lettering of process steps or ingredients is a convenient means for identifying discrete activities or ingredients and the recited lettering can be arranged in any sequence.

Where a range of numbers is presented in the application, it is understood that the range includes all integers and fractions thereof between the stated range limits. A range of numbers expressly includes numbers less than the stated endpoints and those in-between the stated range. A range of from 1-3, for example, includes the integers one, two, and three as well as any fractions that reside between these integers.

As used herein, "master batch" refers to a mixture of base polymer, oxidizable organic component, and transition metal that will be diluted, typically with at least additional base polymer, prior to forming an article. As such, the concentrations of oxidizable organic component and transition metal are higher than in the formed article.

The following examples are included to demonstrate preferred embodiments of the invention regarding synthesis of the molecules and use of the molecules to scavenge oxygen as well products containing such scavengers. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Synthesis of a PTMEG Diester of Benzoic Acid and 3-Sodiosulfo Benzoic Acid and Evaluation of Oxygen Scavenging Properties

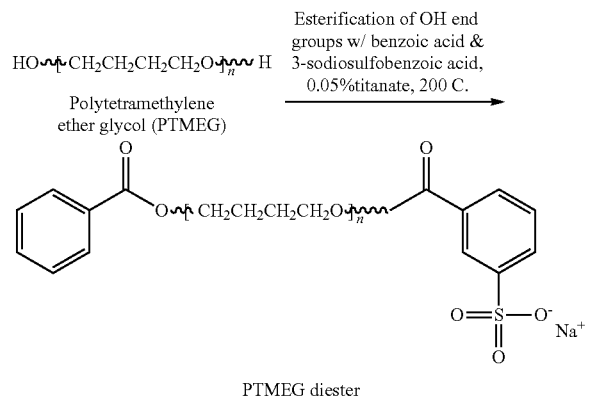

Into a dry, 3-neck glass reactor equipped with a stirrer, a Dean-stark trap head condenser assembly and a nitrogen gas inlet tube, a mixture of benzoic acid (Sigma-Aldrich; 36.6 g, 0.3 mole), 3-sodiosulfo benzoic acid (FutureFuel Chem. Co.; 22.4 g, 0.1 mole), polytetramethylene ether glycol (Polymeg® 2000, a PTMEG grade of 2000 MW from LyondellBassell; 400 g, 0.2 mole) was added followed by addition of 200 ml of xylene as a solvent. To this mixture, 0.5 g of terabutyl titanate (Sigma-Aldrich) was added as an esterification catalyst. The reaction mixture was purged with nitrogen gas and heated gradually to 140-150° C. to a gentle reflux.

Figure 2:
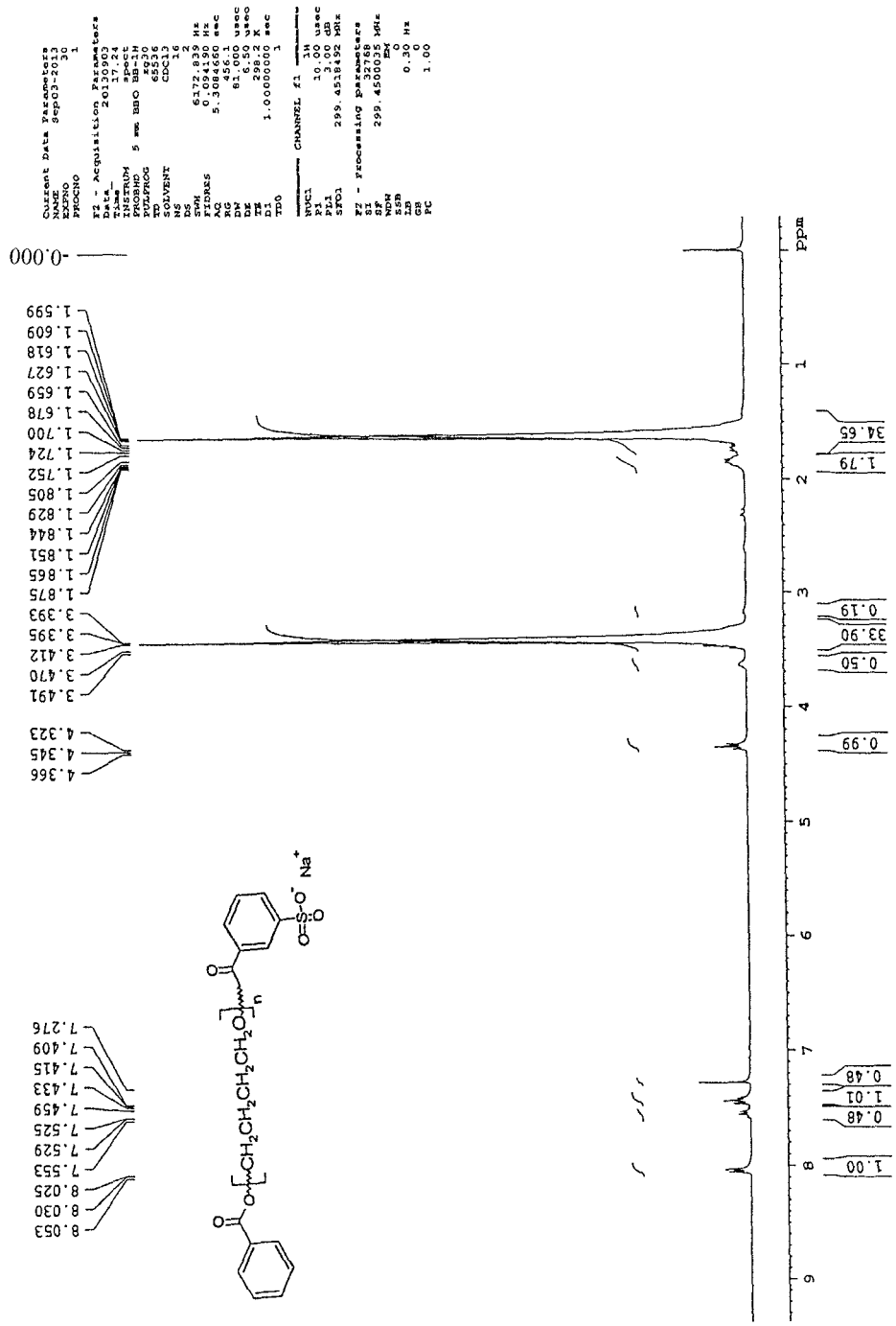
FIG. 2 is an NMR spectrum of an oligomeric PTMEG diester functionalized according to the present invention as detailed in Example 1.

The water formed by the esterification reaction in the above mixture was continuously removed from the distillate collected in Dean-Stark trap. The reaction mixture was heated further until no more water was collected in the Dean-Stark trap (2 hrs). The xylene solvent was then distilled off at atmospheric pressure followed by the application of vacuum to remove any residual traces. The final product consisted of an oligomeric PTMEG diester (a 'PTMEG dibenzoate' comprising a 3:1 mole ratio of benzoate/sulfobenzoate functionalities) was isolated as a semisolid product of ca.100% purity, i.e., free of residual benzoic acid and solvent impurities as checked by TLC. The FTIR spectrum as shown in FIG. 1 and the NMR spectrum as shown in FIG. 2 confirmed the structure.

The PTMEG dibenzoate from above was evaluated as an oxygen scavenging additive in PET bottles made by melt blending and injection molding into the bottle performs followed by reheat stretch blow molding the bottle performs into the bottles. The monolayer preforms were made on a single cavity, 2003 Battenfeld A800/200H/125HC injection molding machine. A pre-blended mixture of a commercial bottle grade PET (DAK Laser+ L40A from DAK Americas, 0.75 IV) dried to a low moisture content <10 ppm), 0.5% PTMEG dibenzoate additive (synthesized as described above) and 0.035% cobalt neodecanoate as the catalyst was fed into the throat of the injection molding extruder heated to 260-270° C. The molten blend was then injection molded, using into a single cavity 30 g 33 mm finish 20 oz ketchup bottle preform to form the monolayer preform. The cycle time for molding was about 30 sec.

In a $2^{nd}$ step, the above PET bottle preforms were reheat-stretch-blow molded into monolayer bottles. In the present example, the bottles were stretch blown on a Sidel SBO-1 machine set to run at a rate of approximately 800 bottles per hour. In the process, the preforms were typically heated to a surface temperature of 99° C. prior to the blowing operation. The blow mold temperature was about 12° C. The blow pressures were about 33 bar. Clear monolayer bottles were obtained.

The oxygen scavenging properties of the above bottles were evaluated using an Oxysense 4000B instrument with OxyDot oxygen sensors (available from OxySense Inc. Dallas, Tex. 752543, USA), for oxygen content/oxygen ingress measurement as follows.

Figure 3:
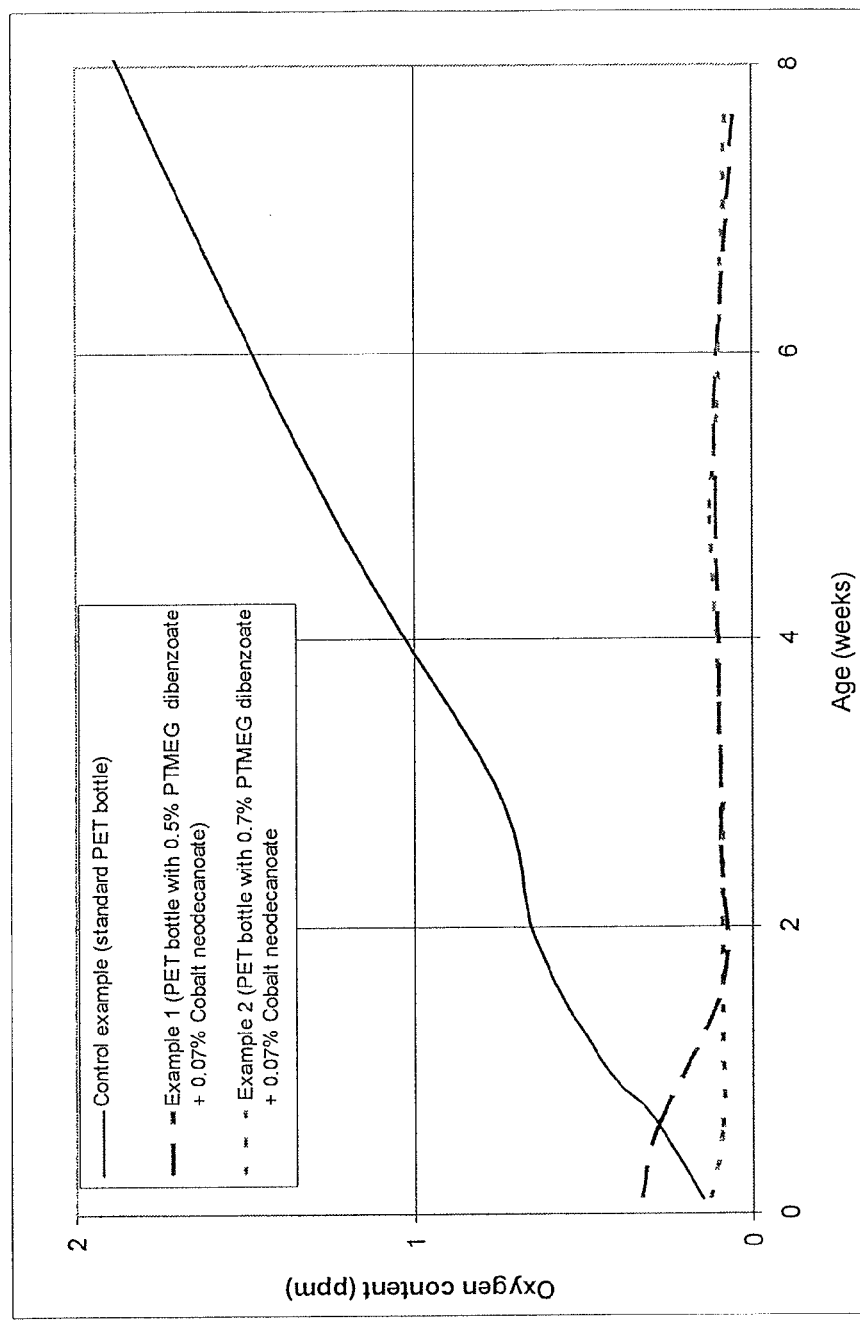
FIG. 3 is a graph illustrating the oxygen scavenging performance of compositions of the present invention.

The OxyDots were attached to the inside middle portion of each test bottle. The bottles were filled with deoxygenated water and capped. To make the measurements, the fiber optic pen of the instrument was aligned with the OxyDot (from the outside of the bottle), making sure that the tip of the pen was making contact with the bottle. Then the capture button was pressed to obtain the oxygen concentration in the bottle. The oxygen concentration was measured repeatedly over time and the results are shown in FIG. 3.

Control Example: A control PET bottle containing only the PET with no additive was prepared using the standard injection stretch blow molding process as described above. The measurement of oxygen ingress in the bottles was made using the OxySense method described earlier in Example 1. The oxygen ingress data is shown in FIG. 3.

Example 2

In this example, the PET bottle composition and process was prepared according to that detailed in Example 1 except that 0.7% PTMEG dibenzoate additive and 0.07% cobalt neodecanoate were employed. The measurement of oxygen ingress in the bottles was made using the OxySense method described earlier in Example 1.

FIG. 3 illustrates the oxygen scavenging performance (via measurement of oxygen ingress) of the monolayer bottles prepared by Example 1 and Example 2 versus a corresponding (i.e., same shape and size) PET bottle as a control.

Example 3

This example illustrates the use of polypropylene glycol dibenzoate (PPG dibenzoate, CAS no. 72245-46-6), as a novel oxygen scavenger additive in PET bottles. PPG dibenzoate is commercially available from Unitex Chemical Corporation under the trade name of Uniplex® 400. In this example, the PET bottle composition and process were similar to those described in Example 1 except that 0.5% PPG dibenzoate additive and 0.05% cobalt neodecanoate were used. The measurement of oxygen ingress in the bottles was made using the OxySense method described above. The oxygen ingress during 3 weeks of storage was found to be reduced, ca. 0.6 ppm as compared to 0.8 ppm in a control PET bottle.

Example 4

In this example, the PET bottle composition and process were similar to those described in Example 3 except that 0.7% PPG dibenzoate additive and 0.05% cobalt neodecanoate was used. The measurement of oxygen ingress in the bottles was made using the OxySense method described above. The oxygen ingress during 3 weeks of storage was found to be reduced, ca. 0.6 ppm as compared to 0.8 ppm in a control PET bottle.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

The invention claimed is:
1. A composition comprising:
   a) a polyester base polymer;
   b) at least one oligomeric, oxidizable poly(alkylene ether) glycol-α,ω-diester having the formula

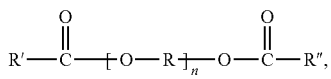

wherein,
   R is a substituted or unsubstituted alkylene chain having from 2 to 10 carbon atoms;
   R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and
   n is from 4 to 100; and
   c) at least one transition metal in a positive oxidation state, said metal being present in the composition in an amount of from about 10 to about 400 ppm, wherein the at least one oligomeric, oxidizable poly(alkylene ether) glycol-α,ω-diester is present in an amount of from about 0.10 to about 10 weight percent of the composition, wherein at least one of R' and R" is either (1) an alkyl sulfonic acid group or a metal salt thereof or (2) an aryl sulfonic acid group or a metal salt thereof.
2. The composition of claim 1, wherein said at least one transition metal is cobalt.
3. The composition of claim 1 wherein the polyester base polymer is polyethylene terephthalate.
4. The composition of claim 1 wherein the oligomeric oxidizable poly(alkylene ether) glycol-α,ω-diester is present in an amount of about 1 to about 5 weight percent based on the weight of the composition.
5. The composition of claim 4 wherein the oligomeric oxidizable poly(alkylene ether) glycol-α,ω-diester is present in an amount of about 1 to about 3 weight percent based on the weight of the composition.
6. The composition of claim 1 wherein the concentration of transition metal is 30 to 150 ppm.
7. The composition of claim 1 wherein at least one of R' and R" is a sodium salt of an alkyl sulfonic acid group or an aryl sulfonic acid group.
8. The composition of claim 1 wherein R is a $C_4$ alkylene group.
9. The composition of claim 8 wherein at least one of R' and R" is a phenyl sulfonic acid group.
10. The composition of claim 9 wherein R' and R" are each a phenyl sulfonic acid group.
11. The composition of claim 9 wherein R' and R" are each a sodium salt of a phenyl sulfonic acid group.
12. The composition of claim 1 wherein the polyester base polymer comprises less than about 40 ppm of phosphorous.
13. The composition of claim 12 wherein the polyester base polymer comprises less than about 10 ppm of phosphorous.
14. The composition of claim 13 wherein the polyester base polymer is substantially free of phosphorous.
15. The composition of claim 1 wherein at least one of the alkyl group having from 1 to 18 carbon atoms and the aromatic group having from 6 to 18 carbon atoms is substituted.
16. A wall for a package comprising at least one layer, said layer comprising a composition, said composition comprising:
   a) a polyester base polymer;
   b) at least one oligomeric, oxidizable poly(alkylene ether) glycol-α,ω-diester having the formula

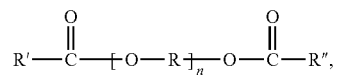

wherein,
   R is a substituted or unsubstituted alkylene chain having from 2 to 10 carbon atoms;
   R' and R" are each independently an alkyl sulfonic acid group or a metal salt thereof, an aryl sulfonic acid group or a metal salt thereof, an alkyl group having from 1 to 18 carbon atoms, or an aromatic group having from 6 to 18 carbon atoms; and
   n is from 4 to 100; and
   c) at least one transition metal in a positive oxidation state, said metal being present in the composition in an amount of from about 10 to about 400 ppm wherein at least one of R' and R" is either (1) an alkyl sulfonic acid group or a metal salt thereof or (2) an aryl sulfonic acid group or a metal salt thereof.
17. The wall of claim 16, wherein said at least one transition metal is cobalt.
18. The wall of claim 16 wherein the polyester base polymer is polyethylene terephthalate.
19. The wall of claim 18 wherein the oligomeric, oxidizable poly(alkylene ether) glycol-α,ω-diester is present in an amount of about 1 to about 3 weight percent based on the weight of the composition.
20. The wall of claim 16 wherein the concentration of transition metal is 30 to 150 ppm.
21. The wall of claim 16 wherein at least one of R' and R" is a sodium salt of an alkyl sulfonic acid group or an aryl sulfonic acid group.

22. The wall of claim 16 wherein R is a O$_4$ alkylene group.

23. The wall of claim 16 wherein at least one of R' and R" is a phenyl sulfonic acid group.

24. The wall of claim 23 wherein R' and R" are each a phenyl sulfonic acid group.

25. The wall of claim 23 wherein R' and R" are each a sodium salt of a phenyl sulfonic acid group.

26. The wall of claim 16 wherein the package is a monolayer container.

27. The wall of claim 16 wherein the package is a multilayer container.

28. The wall of claim 16 wherein the polyester base polymer comprises less than about 40 ppm of phosphorous.

29. The wall of claim 28 wherein the polyester base polymer comprises less than about 10 ppm of phosphorous.

30. The wall of claim 29 wherein the polyester base polymer is substantially free of phosphorous.

31. The wall of claim 16 wherein at least one of the alkyl group having from 1 to 18 carbon atoms and the aromatic group having from 6 to 18 carbon atoms is substituted.

32. A composition comprising:
an oligomeric, oxidizable poly(alkylene ether) glycol-α,ω-diester having the formula:

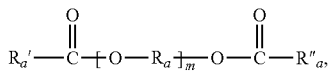

wherein
R$_a$ is a substituted or unsubstituted alkylene chain having from 3 to 10 carbon atoms;
R'$_a$ and R"$_a$ are each independently an alkyl sulfonic acid group or a metal salt thereof an aryl sulfonic acid group or a metal salt thereof, an alkyl group having from 1 to 18 carbon atoms, or an aromatic group having from 6 to 18 carbon atoms; and
m is from 4 to 100,
wherein at least one of R'$_a$ and R"$_a$ is either 1 an alkyl sulfonic acid group or a metal salt thereof or (2) an aryl sulfonic acid group or a metal salt thereof;
at least one oligomeric, oxidizable poly(alkylene ether) glycol-α,ω-diester having the formula

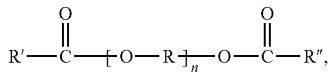

wherein,
R is a substituted or unsubstituted alkylene chain having from 3 to 10 carbon atoms;
R' and R" are each independently an alkyl group having from 1 to 18 carbon atoms, or an aromatic group having from 6 to 18 carbon atoms; and
n is from 4 to 100, and
at least one transition metal in a positive oxidation state, said metal being present in the composition in an amount of from about 10 to about 400 ppm, wherein the at least one oligomeric, oxidizable poly(alkylene ether) glycol-α,ω-diester is present in an amount of from about 0.10 to about 10 weight percent of the composition.

33. A composition comprising:
a) an oligomeric, oxidizable poly(alkylene ether) glycol-α,ω-diester having the formula

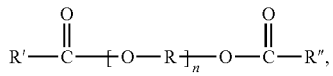

wherein,
R is a substituted or unsubstituted alkylene chain having from 3 to 10 carbon atoms;
R' and R" are each independently an alkyl sulfonic acid group or a metal salt thereof, an aryl sulfonic group or a metal salt thereof, an alkyl group having from 1 to 18 carbon atoms, or an aromatic group having from 6 to 18 carbon atoms; and
n is from 4 to 100,
wherein at least one of R' and R" is either (1) an alkyl sulfonic acid group or a metal salt thereof or (2) an aryl sulfonic acid group or a metal salt thereof;
b) at least one oligomeric, poly(alkylene ether) having the formula

wherein,
R is a substituted or unsubstituted alkylene chain having from 2 to 10 carbon atoms; and
n is from 4 to 100; and
c) at least one transition metal in a positive oxidation state, said metal being present in the composition in an amount of from about 10 to about 400 ppm,
wherein the at least one oligomeric, oxidizable poly(alkylene ether) is present in an amount of from about 0.10 to about 10 weight percent of the composition.

* * * * *